United States Patent [19]

Cox, Jr.

[11] Patent Number: 5,010,681
[45] Date of Patent: Apr. 30, 1991

[54] COOLER FOR LIVE WELL WITH RECIRCULATED WATER

[76] Inventor: Robert A. Cox, Jr., Rte. 80, Box 980, Camdenton, Mo. 65020

[21] Appl. No.: 559,611

[22] Filed: Jul. 30, 1990

[51] Int. Cl.⁵ .............................................. A01K 97/00
[52] U.S. Cl. ........................................... 43/57; 43/55; 43/54.1; 261/121.2; 62/398
[58] Field of Search ............................ 43/56, 57, 55; 261/121.2; 62/398, 459, 460

[56] References Cited

U.S. PATENT DOCUMENTS

| | | | |
|---|---|---|---|
| 1,661,385 | 3/1928 | Pocock | 62/398 |
| 2,542,412 | 2/1951 | Houser | 43/57 |
| 2,951,309 | 9/1960 | Briscoe | 43/57 |
| 3,717,123 | 2/1973 | Regnier | 119/3 |
| 4,182,267 | 1/1980 | Kominami et al. | 119/3 |
| 4,550,522 | 11/1985 | Morton | 43/55 |
| 4,697,380 | 10/1987 | Fenske | 43/55 |
| 4,748,765 | 6/1988 | Martin | 43/55 |
| 4,829,698 | 5/1989 | McDonald | 43/57 |

Primary Examiner—Richard K. Seidel
Assistant Examiner—Patty E. Hong
Attorney, Agent, or Firm—Robbins & Robbins

[57] ABSTRACT

A cooling device is provided for aerated water recycled to live wells for fish. A separate ice chest is provided with a cooling coil through which water from a separate live well may be circulated to be cooled and then aerated when the cooled water is returned to the live well. The life of fish in the live well is prolonged by the combined cooling and aeration. A protective baffle supports the cooling coil against a wall of the ice chest to secure the coil from a central part of the ice chest which may be used for a storage area to cool beverage cans and the like. The protective baffle is designed to provide circulation of ice water to the coil while blocking off the coil from the central storage area.

10 Claims, 1 Drawing Sheet

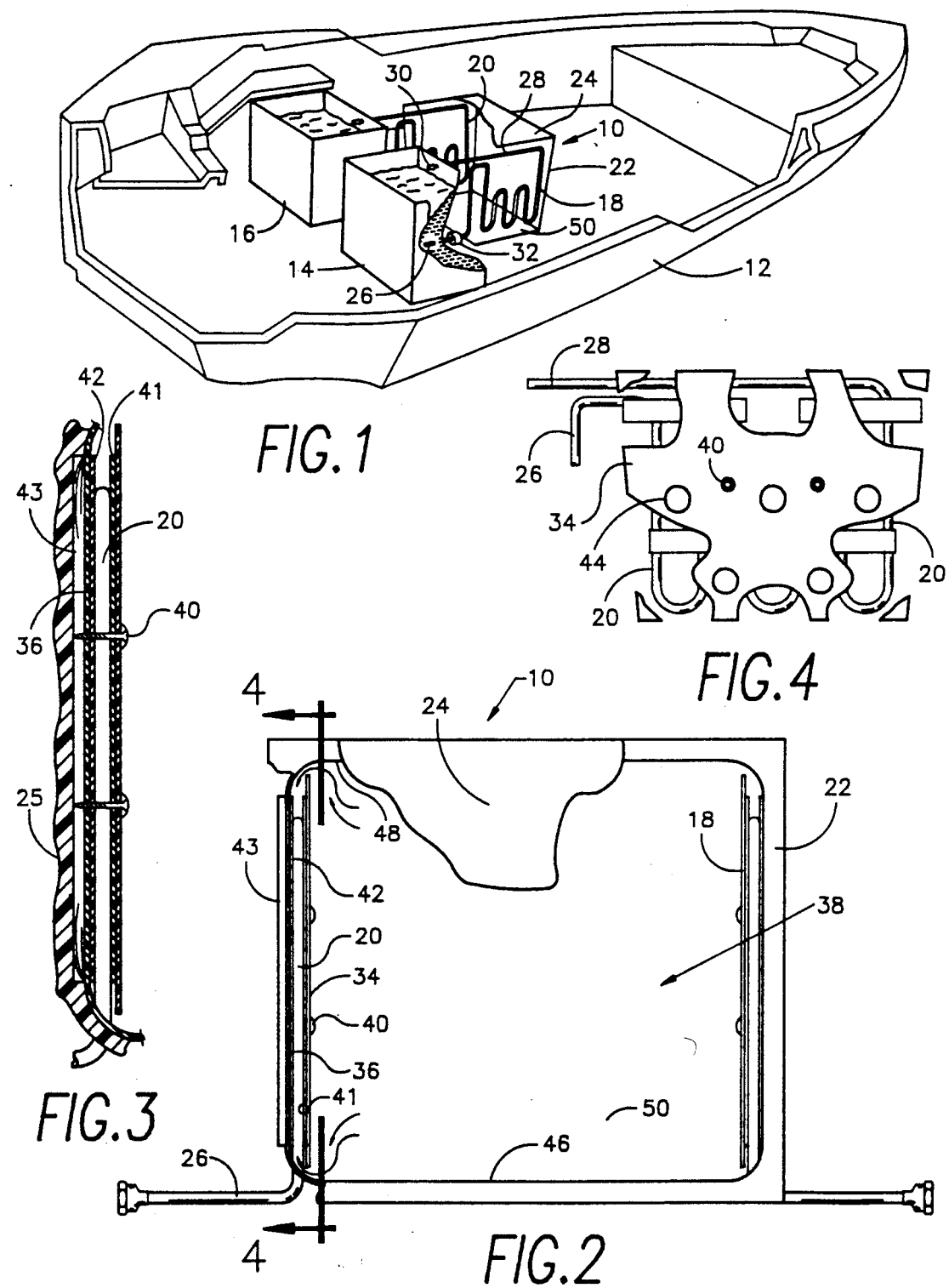

COOLER FOR LIVE WELL WITH RECIRCULATED WATER

BACKGROUND OF THE INVENTION

In the past live wells of one type or another have been employed to keep fish from dying and prolong their life before they are cleaned or released to their native habitat. Such live wells may be used in fishing boats of one type or another and have taken various forms including means for recycling water from the well and providing for aeration to increase the oxygen content and freshness of the water with the aim of prolonging the life of the fish in the live well.

Also employed with the live wells have been coolers of one type or another to either reduce the temperature of the live well water or at least to keep the water from rising in temperature during a prolonged period of fishing. Such coolers have been for the purpose of cooling water recirculated to the live well and thereby promote and enhance the condition of the water in the live well for the wellbeing and longevity of the fish contained therein. When it is considered that the duration of stay of live fish, such as gamefish of one type or another, may be a considerable number of hours and in some cases days the water condition is of great importance.

SUMMARY OF THE INVENTION

By means of this invention there has been provided a simply constructed cooler for live wells which may be combined with aeration devices which can be simply employed with live wells of various type. The cooler is simply constructed in the form of an insulated ice chest with cooling coils which are protected by protective baffles in such a manner that a large central area is provided for the reception of ice and supplies to be cooled such as beverage cans or the like.

The cooling coils are supported by the protective baffle between an interior wall of the ice chest and the baffle in such a manner as to guard against impact by shifting ice or supplies. Further, by the construction of the coils and the protective baffle against an interior wall the central area is left free and unrestricted while the coils are fully protected. The baffle may be employed as a support to hold the coil against the interior wall of the ice chest.

Circulation of ice water in the ice chest is effected around the coils through the provision of holes in the baffle and also by extending the baffle which covers the coils to a close spacing of the edge of the baffle from merging walls of the ice chest with the interior wall against which the coil is positioned.

The combined live well cooler and ice chest may be conveniently constructed of plastic or the like. Through its simplicity, it may be employed with existing live wells as an add-on or integrated in the initial construction as desired. The live well cooler and ice chest find particular benefit for use in fishing boats, such as bass boats or the like, and provide a rugged and efficient and relatively inexpensive solution for keeping fish alive for extended periods as well as for storing supplies to be cooled.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWING

FIG. 1 is a pictorial view partly broken away of a fishing boat provided with a pair of live wells and the cooler of the invention;

FIG. 2 is an enlarged top plan view partly broken away showing the cooler;

FIG. 3 is an enlarged view in longitudinal horizontal section through the coil and wall shown at the left of FIG. 2; and FIG. 4 is a view in reduced scale taken on the line 4—4 of FIG. 2.

DESCRIPTION OF THE INVENTION

The cooler and ice chest of this invention are generally indicated by the reference numeral 10. It is shown in a fishing boat 12 having two separate live wells 14 and 16. Individual and separate cooling coils 18 and 20, of copper or the like, provide for separate cooling of the two live wells 14 and 16.

The live well cooler is comprised of an insulated ice chest housing 22 of plastic or the like having a top cover lid 24 and insulation 25. The cooler for cooling water in the live well is of the same construction for each of the live wells. A conduit 26 for cooling and recycling water from live well 14 leads to coil 18 from which a return conduit 28 conducts cooled water to aerator or sprinkler 30 to return cooled and aerated water to the live well. A pump 32 provides for circulation through the conduits and the cooling coil. The pump and aerator are conventional in construction and form no part of this invention, per se. The conduit and circulation for the separate coil 20 is similar in construction and identical reference numerals are used for the common components.

The separate coils 18 and 20 are individually supported by separate baffles 34, as best shown in FIGS. 2, 3 and 4. The manner of support is identical for both coils. The coil 20 is supported in sandwich relation between an inner wall 36 of the ice chest 22 and the protective baffle 34 in such a manner that a large unrestricted central area 38 is provided for the reception of ice and any supplies to be cooled such as beverage cans or the like. The baffle may be constructed of rigid plastic or the like and forms a protective cover and support for the cooling coil 20. The support may be simply effected by screws 40 securing the baffle to inner wall 36 of the ice chest housing. Reinforcing strips 41, 42 and 43 provide rigidity and spacing of the coil from the inner wall and baffle to enhance water circulation and minimize heat loss.

In order to provide for circulation of ice water in the ice chest to the cooling coil 20 through the baffle, a plurality of openings or holes 44 are formed in the baffle. Circulation around the edges of the baffle is effected by spacing the baffle a slight distance from side walls 46 and 48 and bottom wall 50 of the ice chest housing. By this construction ice water can flow through and around the baffle to the cooling coil to establish needed circulation to cool the coil and the water recycled therethrough. The baffle in effect provides a false wall obscuring and protecting the coil in an effective manner while establishing an unrestricted central storage area for the reception of ice and supplies such as beverage cans or the like to be cooled.

In use the cooler is simply filled with ice which may be crushed, block or cubes. A little water may be added to promote to contact the cooling coils 18 and 20. The storage area 38 may be loaded with appropriate supplies to be cooled. In time as additional ice melts, a greater amount of ice is provided for contact with the coils 18 and 20. Due to the sealed relationship of the cooling coils 18 and 20 and the recycle conduits the contents of the ice chest are protected from any contamination by the live well water and vice-versa regarding freedom of the contamination of the live well water by the ice water and contents.

The recycling of the live well water is effected by the pump 26 and aeration of the cooled water by aerator 30 completes the recycling and cooling to the live well.

Various changes and modifications may be made within this invention as will be apparent to those skilled in the art. Such changes and modifications are within the scope and teaching of this invention as defined in the claims appended hereto.

What is claimed is:

1. A cooler and aerator for live wells and storage chest for items to be cooled, said cooler comprising an ice chest having an open central area for receiving ice and said items to be cooled, a cooling coil in said ice chest having an inlet receiving water from a live well and an outlet communicating with an aerating means for discharging cooled aerated water into said live well, means for circulating water from said live well through said coil and aerating means, means for supporting said coil adjacent an interior side wall of said ice chest, said means comprising a protective rigid baffle substantially covering said coil, said baffle being supported with respect to said coil and said interior wall to provide for free circulation of ice water from said open central area past said coil, said coil being supported in sandwich relation between said interior side wall and the baffle.

2. The cooler of claim 1 in which said baffle is provided with a plurality of holes to provide for said free circulation of ice water.

3. The cooler of claim 1 in which said baffle extends substantially completely along said interior side wall, said interior wall being joined by merging walls of said ice chest and edges of said baffle being spaced a slight distance from said merging walls to provide for said free circulation of ice water.

4. the cooler of claim 1 in which said baffle is connected to said interior side wall to hold said coil in clamped relation against said interior side wall.

5. The cooler of claim 2 in which said baffle is provided with a plurality of holes to provide for said free circulation of ice water, said baffle extends substantially completely along said interior side wall, said interior wall being joined by merging walls of said ice chest and edges of said baffle being spaced a slight distance from said merging walls to provide for said free circulation of ice water.

6. The cooler of claim 4 in which said baffle is provided with a plurality of holes to provide for said free circulation of ice water and said baffle extends substantially completely along said interior side wall, said interior wall being joined by merging walls of said ice chest and edges of said baffle being spaced a slight distance from said merging wall to provide for said free circulation of ice water.

7. The cooler of claim 1 in which the cooler provides cooled aerator water to a plurality of separate live wells, a separate cooling coil being provided for each live well and separate baffles being provided for said separate coils and separate interior side walls.

8. The cooler of claim 7 in which said coils are supported in sandwich relation between said interior side wall and the baffle.

9. The cooler of claim 7 in which said baffles are provided with a plurality of holes to provide for said free circulation of ice water and each of said baffles extend substantially completely along said interior side walls and is spaced a slight distance from merging walls of the ice chest to provide for said free circulation of ice water.

10. The cooler of claim 8 in which said coils are supported in sandwich relation between said interior side wall and the baffle and said baffles are provided with a plurality of holes to provide for said free circulation of ice water and each of said baffles extend substantially completely along said interior side walls and is spaced a slight distance from merging walls of the ice chest to provide for said free circulation of ice water.

* * * * *

UNITED STATES PATENT AND TRADEMARK OFFICE
CERTIFICATE OF CORRECTION

PATENT NO. : 5,010,681
DATED : April 30, 1991
INVENTOR(S) : Robert A. Cox, Jr.

It is certified that error appears in the above-identified patent and that said Letters Patent is hereby corrected as shown below:

Column 4

Claim 10, line 38, claim referenced "8" should read -- 7 --.

Signed and Sealed this

Eighteenth Day of August, 1992

Attest:

DOUGLAS B. COMER

Attesting Officer                Acting Commissioner of Patents and Trademarks